Figure 1:
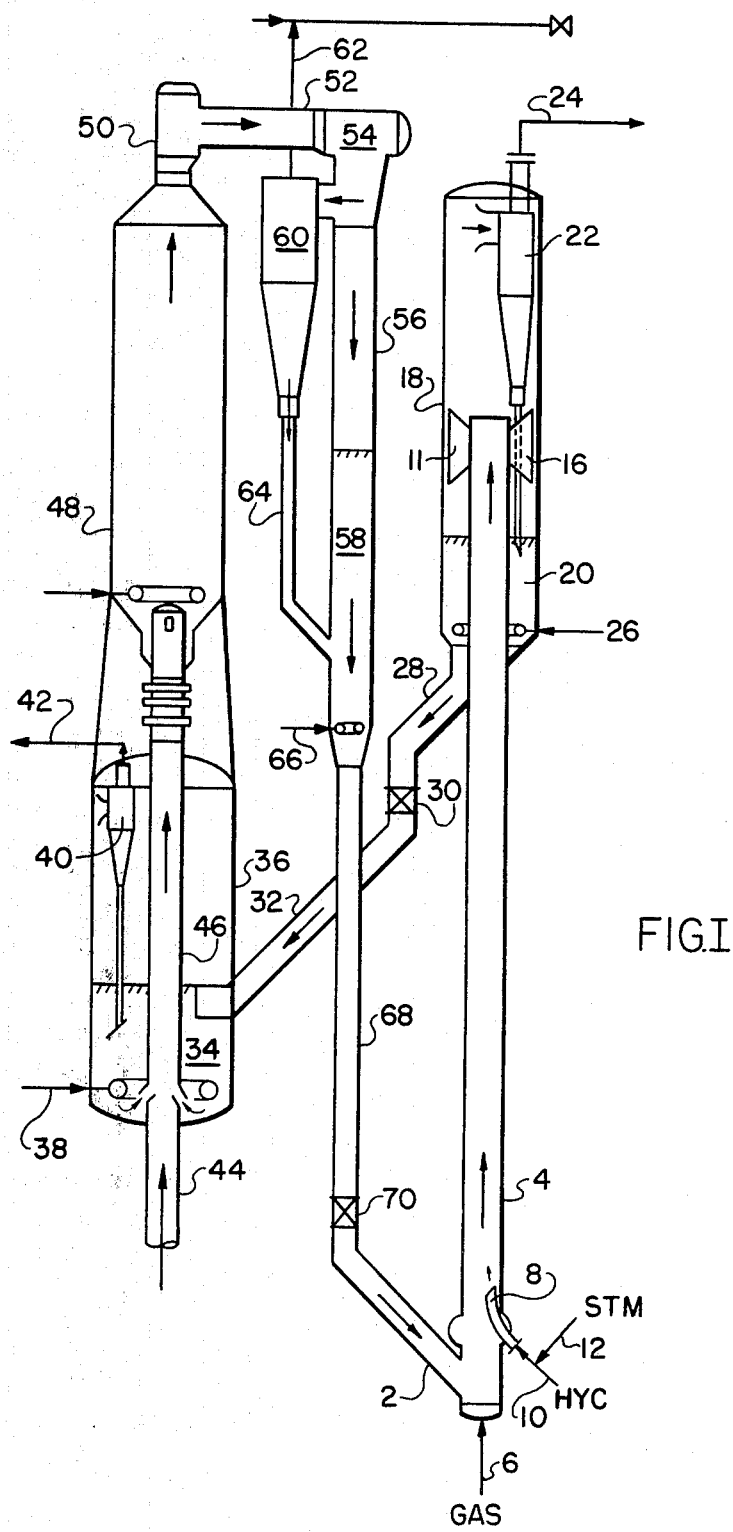

United States Patent [19]

Dean et al.

[11] 4,336,160
[45] Jun. 22, 1982

[54] METHOD AND APPARATUS FOR CRACKING RESIDUAL OILS

[76] Inventors: Robert R. Dean, 4361 Riverview Dr.; Jean-Louis Mauléon, 315 Grant St., both of Alma, Mich. 48801; Robert W. Pfeiffer, 6 Alden Pl., Bronxville, N.Y. 10708

[21] Appl. No.: 169,480

[22] Filed: Jul. 15, 1980

[51] Int. Cl.³ .................... B01J 21/20; B01J 29/38; C10G 11/18; C10G 11/04
[52] U.S. Cl. .................. 252/417; 208/113; 208/120; 208/161; 208/164; 422/144; 422/145
[58] Field of Search ............. 208/113, 164, 161; 252/417, 419

[56] References Cited

U.S. PATENT DOCUMENTS

| | | | |
|---|---|---|---|
| 2,398,739 | 4/1946 | Greensfelder et al. | 252/417 |
| 2,438,439 | 3/1948 | Hemminger | 252/417 |
| 2,475,650 | 7/1949 | Thompson et al. | 252/417 |
| 3,563,911 | 2/1971 | Pfeiffer et al. | 252/417 |
| 3,919,115 | 11/1975 | Stine et al. | 252/417 |
| 3,964,876 | 6/1976 | James | 208/156 |
| 4,176,084 | 11/1979 | Luckenbach | 252/417 |

FOREIGN PATENT DOCUMENTS

| | | | |
|---|---|---|---|
| 601682 | 7/1960 | Canada | 252/417 |
| 2001545 | 2/1979 | United Kingdom | 252/417 |

Primary Examiner—P. E. Konopka
Attorney, Agent, or Firm—Carl D. Farnsworth

[57] ABSTRACT

A side by side hydrocarbon conversion-two staged stacked catalyst regeneration arrangement is provided wherein the first stage of catalyst regeneration is temperature restricted to achieve incomplete removal of carbon deposits and a second higher temperature regeneration is accomplished in an upflowing catalyst contact system under conditions to accomplish removal of residual carbon on the catalyst and produce a $CO_2$-rich flue gas. A special external cyclone separator arrangement may be attached to either of the second stage regeneration operation or the riser hydrocarbon conversion operation to effect separation of catalyst particles from gasiform material.

5 Claims, 3 Drawing Figures

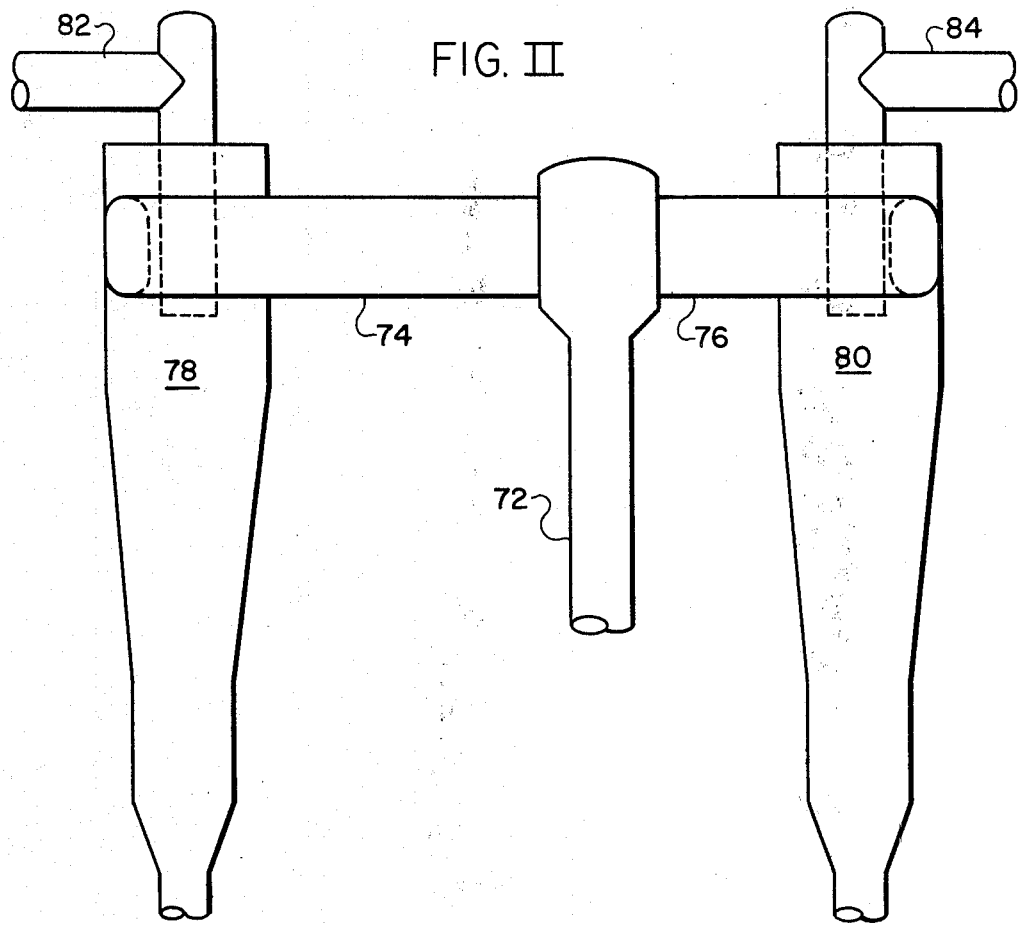
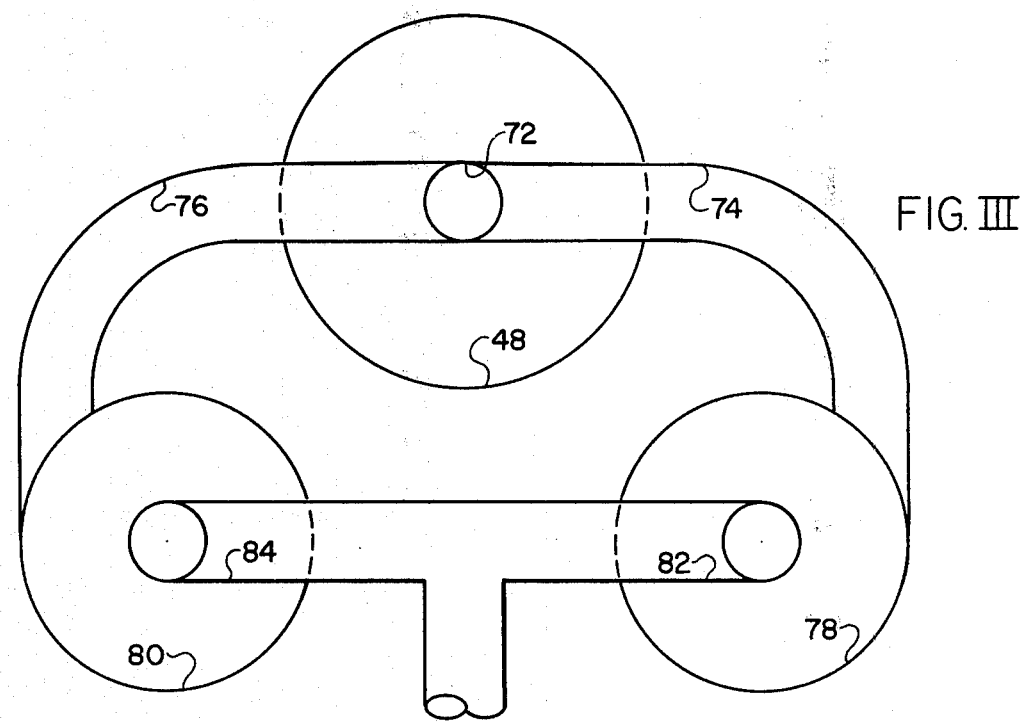

METHOD AND APPARATUS FOR CRACKING RESIDUAL OILS

The prior art identifies residuel oils as residual, reduced crude oils, atmospheric tower bottoms, topped crudes, vacuum resids, or simply heavy oils. Such high boiling portions of crude oils are also known as comprising very refractory components, such as polycyclic aromatics and asphaltenes, which are considered difficult to catalytically crack to form high yields of gasoline plus lower and higher boiling hydrocarbon fractions because of the deposition of large amounts of coke on the catalyst. Furthermore, metal contaminants in the heavy oil fractions of crude oil comprising vanadium, nickel, copper, iron, etc. are deposited on and/or in the pores of the catalyst, thereby further poisoning and/or inactivating the catalyst so employed. Indeed the prior art considers that the effect of the coking tendencies of the heavy oil fractions plus the heavy metals effect are so overpowering that the resulting product yield structures are unacceptable in terms of industry economics.

In view of prior art identified problems for processing heavy crudes and bottom fractions thereof, comprising such contaminants, it has been previously proposed to effect a separation of materials comprising the residual or heaviest fractions or to effect a preconversion of the heaviest and undesirable components. Different techniques to accomplish the desired separation, such as vacuum distillation, solvent extraction, hydrogenation or certain thermal cracking process, have been relied upon in the prior art for contaminant separation or control. Adsorption of undesired components, particularly metal components, on particulate material of little or no cracking activity has also been employed. Thermal cracking, such as delayed and fluid coking, as well as visbreaking operations, have been employed to upgrade heavy residual oils; however, the resultant products boiling above 400° F. have not proven to be particularly good feed stocks for fluid catalytic cracking due to resultant high concentrations of polynuclear compounds.

Residual oil comprising relatively high boiling fractions of crude oil obtained as atmospheric tower bottoms and/or vacuum tower bottoms contained therein are, therefore, regarded as distress stocks by the petroleum industry because the oils contain large quantities of components generally considered to have coke forming tendencies as well as heavy metals components. For example, a residual oil may contain a carbon residue in excess of 0.6% by weight, and this characteristic is considered by the industry to contribute to producing high additive coke in a cracking operation and along with the high metals levels will operate to rapidly deactivate the cracking catalyst, leading to uneconomic yield results. Hence, the prior art has tended to exclude these materials from fluid cracking feeds.

Residual oils for the purpose of this invention can include materials boiling from 400° F. to the final end point of crude oil, in excess of 1800° F. Contained in this broad boiling range feed stock can be light gas oils boiling from about 400° F. to 700° F., medium gas oils boiling from about 600° F. to 850° F., heavy gas oils boiling from about 600° F. to 1200° F., and components boiling beyond 1200° F. up to the final boiling point of the crude oil, including carbon producing components, such as polycyclic aromatics, asphaltenes and metal contaminants, as well as whole crudes. Separately prepared stocks such as those prepared by solvent extraction or hydrogenated stocks may also be included as feed to the process.

It is generally considered that the fluid catalytic cracking of feeds containing components boiling beyond 1200° F. leads to poor conversion to gasoline and lighter components, high coke production and excessive temperature levels during the regeneration step. The excessive regeneration temperatures are considered harmful both to conventional equipment and to the catalyst employed in the process.

The Invention

This invention relates to the simultaneous conversion of both the high and low boiling components contained in residual oils with high selectivity to gasoline and lighter components and with low coke production. The past problems related to high regenerator and catalyst temperatures are substantially obviated by the processing concepts of the invention. Indeed this invention encourages high catalyst regeneration temperatures and takes advantage of these high temperatures of the catalyst to cause the desired cracking reactions to occur, at high conversion and high selectivity to gasoline and products which are gasoline precursors on a once through basis, without excessive coke formation. Fluid catalytic cracking is successfully practiced with feed stocks derived by distillation, solvent extraction and by hydrogenation, up to distillation ranges capable of instantaneous vaporization by hot regenerated catalyst. Experiments with cracking of the high boiling residual hydrocarbon components have met with less than desired results due in substantial measure to the fact that the prior experimenters were considerably constrained and failed to appreciate that success is only possible if substantially instantaneous and complete atomization/vaporization is achieved by the initial contact of the feed with very hot catalyst at a temperature above the pseudo-critical temperature of the feed. This means that as the boiling range of a gas oil feed is increased by inclusion of residua, the catalyst temperature must also be increased. The prior art has not only failed to recognize this concept, and thus ignored these facts, but has deliberately restrained the process from achieving the necessary high catalyst temperature due to two factors:

(1) Metallurgical limits of the regeneration equipment, and (2) Thermal stability of the catalyst.

Current available fluid cracking art tends to agree that the maximum practical temperature of regeneration and, therefore, the resulting regenerated catalyst temperature should be restricted to within the range of about 1300°–1400° F. even though temperatures up to 1600° F. are broadly recited. The temperature restriction of 1300°–1400° F. in reality necessarily restricts therefore the feeds charged to catalytic crackers, to distilled, solvent extracted and hydrogenated gas oil stocks in order to achieve desired conversion levels.

The present invention deals with providing an arrangement of apparatus or equipment and techniques of using, which will permit extending the temperature of regeneration up to at least 1800° F. without unduly impairing catalyst activity. The invention also identifies an array of equipment or apparatus means capable of withstanding the severe temperature operations contemplated by the invention.

Thus, for example, the undistilled portion of crude oil boiling from about 400° F. or higher, up to the crude oil end point such as topped crude oils can be cracked under conditions achieving high conversions of the oil feed to form gasoline and lighter hydrocarbons with yield results comparable to prior art gas oil cracking including comparable coke makes. The need for expensive feed preparation techniques and apparatus in the form of distillation, solvent extraction, hydrogenation or various thermal processes is thus obviated.

The products produced from the process of the invention will be similar to those derived from more conventional gas oil fluid catalytic cracking operations. That is, $C_2$'s and lighter gases, $C_3$ and $C_4$ olefins, and paraffins, gasoline boiling from $C_5$'s to 430° F. end point and cracked gas oils are obtained. The cracked gas oils thus obtained and known as light and heavy cycle oils or decanted oil are of such a quality that they can be hydrogenated for sale as low sulphur fuel oils, mildly hydrogenated and returned to the fluid catalytic cracker for more complete conversion to gasoline or preferably, hydrocracked more completely to gasoline boiling components.

Hydrocracking of the cracked gas oils obtained as herein described to form gasoline coupled with alkylation of the catalytic $C_3$'s and $C_4$'s results in yields of gasoline per barrel of 400° F.+ crude oil residuum charged to the catalytic cracker of up to 125% plus 3–4% propane. Such an overall processing sequence is in energy balance if not a net exporter of fuel gas and steam to other applications. The energy balance includes that required for the crude oil topping operation.

A most important parameter for successful residual oil cracking is to be ensured of a most complete intimate flash contact and substantially complete atomization/vaporization of the feed substantially upon contact with the hot catalyst. The residual higher boiling portion of the feed must also be substantially vaporized upon contact with hot regenerated catalyst, because only by more complete atomized vaporization of the feed components can the feed be more completely cracked to gasoline yielding components. What does not vaporize remains essentially unconverted resulting in high yields of catalytic cycle oils and/or is adsorbed on the hot catalyst surface and tends to be converted particularly to coke, thereby resulting in a loss of gasoline yield and a lowering of catalyst activity. For optimum conversion, the mix temperature should at least be equal to a preferably above the psuedo-critical temperature of the feed charged but not so much higher that undesired overcracking occurs.

The feed preheat temperature, the temperature of the hot generated catalyst, the volume of diluent such as steam injected with the feed and the unit operating pressure are the four main operating variables readily available to achieve the conditions necessary to accomplish substantially complete vaporization of the feed and, in turn, achieve a high selectivity conversion to gasoline and lighter compounds and the production of heavier oils of a quality suitable for hydrocracking to additional gasoline.

An additional desired operating parameter is that of providing an equilibrium temperature in the riser cross-section, substantially instantaneously with well designed and arranged multi-injection nozzles. A feed exit velocity at the nozzles of 10 to 50 feet per second is particularly desired, with the feed nozzles arranged as nearly as possible on the equal area circle of the riser cross-section. Each feed nozzle is preferably steam jacketed to reduce any coking of the hydrocarbon feed within the nozzle. Preferably about 5 wt.% or less steam or other suitable diluent material is also injected into the feed to reduce the equilibrium flash temperature, and to provide the best achievable oil atomizing effect. Typical dispersion steam rates range from 1 to 15 wt.% on feed.

The above identified factors relating to the contacting and mixing of the oil with the catalyst are intended to accelerate the mixture relatively uniformly within the vaporization zone in a minimum time frame and thus provide minimum catalyst slippage thus enhancing rapid heat transfer from the hot catalyst to the oil feed and to prevent localized enhanced catalyst to oil ratios. That is, conditions are selected to ensure dilute phase contact between catalyst and oil feed in the vaporization section as opposed to localized dense phase contact.

Typically, a reduced crude feed contains 10 to 12% hydrogen in its molecular structure. The lighter fractions are generally richer in hydrogen than the heavier fractions. Generally the heavier and larger molecular structures are considered hydrogen deficient. The lighter, hydrogen rich fractions are relatively thermostable but are relatively easily catalytically cracked with special catalysts such as zeolite containing catalysts. The heavier hydrogen deficient fractions are thermo-unstable and readily thermocracked on contact with solids at temperatures in the range of from 1000°–1800° F. Indeed the instantaneous and complete vaporization of the heavy fractions, discussed above, encourages simultaneous thermocracking of the high molecular weight components (asphaltenes) leading to the ultimate successful conversion of the total feed to high gasoline yields with low coke make.

Achieving complete atomization/vaporization of the heavy components of feed substantially instantaneously upon contact with the catalyst through the mechanisms of high catalyst temperature, low hydrocarbon partial pressure plus the use of a multi-nozzled feed injection system to prevent localized bed cracking will encourage the desired thermocracking of the large asphastene type structures. Failure to accomplish the above will lead to the phenomenon of "coke shut-off". This is a phenomenon where heavy hydrogen deficient molecules block the pores of the catalyst rendering the catalyst ineffective in terms of producing high conversions to desired products from either the light or heavy components of the feed.

In the design and operation of a unit of the type described by this invention a basic consideration is that the temperature of catalyst regeneration is unrestrained at least up to a temperature of about 1800° F. While the factors of feed preheat temperature, riser temperature, hydrocarbon partial pressure, and the nature of feed injection and distribution are important, they each have practical limitations and once each is optimized with respect to their practical limitation one must rely upon the fact that the temperature of the regenerator is unrestrained and can be allowed to rise to suit the needs of a particular feed stock to achieve the desired instantaneous vaporization and simultaneous thermocracking of the large, less stable molecular structures.

Table 1 shows the effect on gasoline and coke make when cracking a particular atmospheric resid without a regeneration temperature restraint compared to cracking with the regenerator restrained with respect to temperature. These operations are compared to cracking a gas oil obtained from the same crude oil following vacuum reduction to remove asphaltic type components and cracking the resultant gas oil under prior art conditions.

Table 1 shows that as the regenerator or catalyst temperature is restrained in a resid cracking operation gasoline yield decreases significantly and coke make increases rather correspondingly. It should also be noted that residua can be cracked to higher gasoline yields and at similar coke make as obtained with a conventional gas oil feed stock.

Table 2 emphasizes the same factors wherein gas oil cracking data is shown compared to 10 vol.% and 20 vol.% vacuum residua added to the same gas oil feed. This tabulation demonstrates that the presence of the residua under optimized conditions results in higher overall conversions, higher gasoline yields and equal if not slightly lower coke makes than conventional gas oil cracking.

TABLE 1

Effect of Restraining Regenerator Temperature and Comparison of Atmospheric Bottoms With Gas Oil Only Feed

|  | Atmospheric Bottoms | | Gas Oil Only |
|---|---|---|---|
|  | High | Low | Conventional |
| Regenerator Temp | | | |
| Gasoline Yield Vo. % | 67.7 | 63.5 | 61.5 |
| Coke Wt. % | 5.3 | 8.0 | 6.1 |

TABLE 2

Gas Oil Cracking Present Art Versus Resid Cracking

|  | Gas Oil | Gas Oil + 10% Resid | Gas Oil + 20% Resid |
|---|---|---|---|
| Mild Conversion Operation | | | |
| Conversion Vol. % | 66.0 | 71.0 | 79.0 |
| Gaso. Yield Vol. % | 59.8 | 61.8 | 66.1 |
| Coke Wt. % | 3.0 | 3.6 | 5.6 |
| Optimum Conversion Operation | | | |
| Conversion Vol. % | 76.5 | 77 | 79.5 |
| Gaso. Yield Vo. % | 61.5 | 67.4 | 67.7 |
| Coke Wt. % | 6.1 | 4.3 | 5.3 |

Analyses of the products produced when cracking full atmospheric bottoms compared to gas oils only from the same crude oil show certain other interesting properties;

(1) Liquid products produced have higher average hydrogen contents.
(2) The research octane of the gasolines is significantly higher.
(3) The motor octane of the gasolines is significantly higher resulting in a much improved (R+M)/2 rating important in unleaded gasoline production.
(4) The cracked gas oil products commonly referred to as light and heavy cycle oils and decanted oil are substantially richer in di and tri condensed aromatics in preference to 4, 5 and 6 condensed aromatic rings. The high concentration of two and three member condensed aromatics in the cracked product makes these stocks highly desirable feeds for hydrocracking to gasoline.
(5) The coke produced under optimum operating conditions is very low in hydrogen content. Hydrogen levels in the 3-6 wt.% range are observed versus 8-10 wt.% obtained in prior art gas oil cracking operations. The lower hydrogen level of the coke produced is only explainable by the fact that the operating conditions employed encourages polymerization of polycyclics attracted to the catalyst surface, thereby releasing significant amounts of additional hydrogen for utilization in hydrogen transfer reactions in order to obtain the observed higher hydrogen content of the liquid products. This phenomenon is not observed in the present day gas oil cracking. These reactions are exothermic and hence significantly offset the endothermic heat of reaction of the primary cracking reaction. As a result the overall heat of reaction may be reduced as much as 40 to 50%. This contributes to lower catalyst circulation rates and consequently lower coke makes. The low hydrogen level in the coke is also a major factor of consideration when catalyst regeneration is conducted in the manner embodied in this invention.

A highly siliceous catalyst comprising one of alumina or magnesia with or without a catalytically active crystalline aluminosilicate or crystalline zeolite and of a fluidizable particle size preferably in the range of about 20 to about 200 micron size may vary considerably in cracking activity and levels of metal contaminants accumulated in the cracking operation. If the build up of the metals on the catalyst precludes maintaining a desired conversion level, it is contemplated employing a continuous or semi-continuous catalyst make up and removal of disposal of contaminated catalyst to maintain desired cracking activity aside from regeneration of the catalyst. On the other hand, the catalyst inventory may be substantially completely or partially replaced at turn around conditions or after an extended period of operation as is most convenient to the operation to achieve desired conversion of the feed.

Metals poisoning has long been recognized as a major obstacle to resid cracking. It has been found, however, that these metal contaminants can be passivated to some considerable extent at a high regenerator temperature and their adverse effects markedly reduced when the coke on recycled catalyst is maintained below about 0.05 wt.%. It has been found that about 5% conversion is lost per 0.1 wt.% coke on regenerated catalyst in addition to the expected coke deactivation, because of metals contamination. However, in the reduced crude cracking operation of this invention metals like nickel, vanadium and iron, show some beneficial properties such as activating or enhancing dehydrogenation, hydrogen transfer reaction, and promote CO combustion in the regenerator to achieve a lower coke on recycled catalyst without any need for an outside promoter. On the other hand sodium and all alkaline metals are still regarded as severe contaminants for particularly a zeolite containing catalyst. Thus, it has been found that feed desalting is a more economical approach to solving the sodium problem than using "soda sink" scavengers. With proper desalting of the feed, sodium therein can be controlled well below 1 PPM.

Catalyst Regeneration

In order to achieve the desired high catalyst temperatures required to properly effect successful cracking of oils comprising residual oils, special regeneration techniques are required along with specially designed and employed apparatus or operating equipment. The high temperature cracking technique of the invention encourages relatively high levels of coke or hydrocarbonaceous material to be deposited on the catalyst during its exposure to the oil feed. Levels not normally below 1 wt.% and in some instances over 2 wt.% will occur. It is particularly desirable, however, to regenerate the catalyst to carbon levels below 0.10 wt.% desirably to at least 0.05 and more preferably to about 0.02 wt.%. Regeneration techniques and apparatus or equipment employed in present day cracking of gas oils are unsuitable for achieving the severity of catalyst regeneration required in residual oil cracking for the following reasons:

(1) The high coke levels permitted to build on the catalyst are encouraged by low catalyst circulation rates, that is, by low catalyst to oil ratios. The combination of low catalyst to oil ratios and high carbon levels leads automatically to high regeneration temperatures. Temperatures that are in excess of the normal limits placed upon the stainless steel employed in present day regenerators, in the design of cyclone systems and catalyst withdrawal systems, etc. Also, the temperatures contemplated are beyond the current temperature limits of present day power recovery systems of about 1400° F.

(2) The high activity catalysts presently employed in catalytic cracking are not structurally thermo-stable at the high regenerator temperatures of the invention if this severe regeneration is conducted in a single stage or even in a multi stage regenerator where the multi stages are contained in a single vessel. Two very basic factors effect the catalyst stability during regeneration. At higher and higher coke levels on the spent catalysts, higher and higher catalyst particulate temperatures are developed as the high level of coke is burned in a single vessel even if multi stage single vessel regeneration is employed. These high surface temperatures themselves will render the catalyst ineffective. Secondly, the catalyst deactivates rapidly at high temperatures when the steam formed during coke combustion from associated molecular hydrogen is allowed to remain in contact with the catalyst when the catalyst reaches its highest temperature.

A particular embodiment of this invention is to conduct the regeneration of the spent catalyst in a two vessel system, comprising of two stage sequential catalyst flow system designed and operated in such a particular manner that the prior art catalyst regeneration difficulties are overcome. The catalyst regeneration arrangement of this invention achieves a coke on recycled catalyst level preferably less than 0.02 wt.% without exceeding undesired metallurgical limitation or catalyst thermostability.

The catalytic cracking process of this invention relates to the cracking of high boiling hydrocarbons generally referred to as residual oils and boiling initially at least 400° F. or higher, obtained from crude oil, shale oil and tar sands to produce gasoline, lower and higher boiling hydrocarbon components. The residual oil feed is mixed in a riser reaction zone with a highly active cracking catalyst recovered from a regeneration zone at a temperature preferably above the feed pseudo-critical temperature. The hydrocarbon feed preheated to a temperature below 800° F. is mixed with the very hot regenerated catalyst under conditions to form a generally vaporous hydrocarbon-catalyst suspension. A separation device or arrangement employed at the riser discharge separates from about 70–90% of the catalyst from the vapors. The unique feature of a particular device employed is that it allows higher than usual vapor superficial velocities in the disengaging vessel before the vapors enter the reactor cyclones. Hydrocarbons leaving the reactor cyclones are separated in a downstream fractionation column. The spent catalyst recovered from the riser cracking operation following stripping thereof and at a temperature in the range of about 900° F. to about 1100° F. and deactivated by 1.0 wt.% to 2.5 wt.% of coke, is passed to a temperature restricted dense fluid bed of catalyst in a first stage catalyst regeneration zone.

The regeneration operation to be accomplished in the first stage of regeneration is one of relatively mild temperature sufficient to burn all the hydrogen present in hydrocarbonaceous deposits and from about 10 to 80% of the total carbon therein. The regenerator temperature is restricted to within the range of 1150° F. to 1500° F. and preferably to a temperature which does not exceed the metallurgical limits of the regenerator. Flue gases rich in CO are recovered from the first stage regenerator and may be directed to a CO boiler for more complete combustion therein and/or through a power recovery section prior to a CO boiler. The mild regeneration serves to limit local catalyst hot spots in the presence of steam formed during the hydrogen combustion so that formed steam will not substantially reduce the catalyst activity. A partially regenerated catalyst is recovered from the first regenerator substantially free of hydrogen. The hydrogen freed catalyst comprising residual carbon is passed to a second stage higher temperature regenerator where the remaining carbon is substantially completely burned to $CO_2$ at an elevated temperature within the range of 1400° F. up to 1800° F.

The second stage high temperature regenerator is designed to minimize catalyst inventory and catalyst residence time at the high temperature while promoting a carbon burning rate to achieve a carbon on recycled catalyst less than 0.05 wt.% and more preferably less than 0.02 weight percent.

Traditionally designed regenerators utilized in prior art fluid catalytic cracking have contained various internal components fundamental to the successful operating needs of the process. These include cyclones, usually of several stages, designed to limit process losses of catalyst, catalyst return conduits from the cyclones to the catalyst bed (dip legs), various support and bracing devices for the above mentioned means. A hopper or similar device plus associated conduits to enable collection and withdrawal of catalyst back to the cracking part of the process. Of necessity, in prior art systems, these various above mentioned means are of metallic construction, usually stainless steel, and exposed directly to the combustion zone of the regenerator. It is the presence of these means in the combustion zone that limit the maximum temperature that can be supported in the regeneration of catalyst. Generally this leads to a maximum operating temperature of about 1400° F.

The second stage high temperature regenerator embodied in this invention eliminates the above mentioned limitations by locating all devices such as cyclones, dip legs, draw off hopper or well and support systems outside the combustion zone and indeed external to the regenerator itself. The regenerator vessel, void of any internals above the catalyst combustion zone, is refractory lined as are all connecting conduits, external cyclones and dip legs. The design of such a regenerator combination is considered to be an improvement over any known prior art. Regenerated catalyst at a desired elevated temperature is withdrawn from the dense catalyst bed of the second stage regenerator by means of a withdrawal well external to the regenerator vessel. The withdrawn catalyst is charged to the riser reactor at the desired elevated temperature and in an amount sufficient to vaporize the hydrocarbon feed charged according to the operating techniques of this invention. Hot flue gases are fed to external cyclones for recovery of catalyst fines before further utilization as by passing to a waste heat recovery system and then to an expander turbine or discharged to the atmosphere. Due to the fact that the cyclones of the highest temperature regeneration stage are externally located, some major and significant advantages aside from those cited above are gained.

Once the cyclone separators are moved from the interior of the catalyst regeneration device to the exterior, it is practical to reduce the diameter of the cyclone device and improve its efficiency in such a way that a single stage cyclone separator means can be used in place of a two stage cyclone means and yet accomplish improved separation efficiency. This is accomplished by use of an obround flue gas transfer pipe including a curved section thereof external to the cyclone but coinciding with the cyclone curvature and tangentially connected to the cyclone. This curved obround transfer means induces an initial centrifugal motion to the hot flue gas catalyst particle suspension thereby encouraging substantially improved cyclone efficiency and enabling a significant reduction in cyclone diameter. In addition, a most significant factor favoring the use of the external cyclone is that the cyclone overall length can be increased as it does not have to fit inside a refractory lined regenerator vessel of limited space and the cyclone separating efficiency is again significantly improved. The net effect of the above two design considerations is that a single stage external cyclone is the operating equivalent of a two stage internal cyclone system. Externally located refractory lined cyclones can be fabricated of carbon steel even with a regenerator temperature up to 1800° F. Furthermore, the external cyclones can be checked during on stream use with an infrared camera and easily replaced during a shutdown.

The residual oil cracking process of this invention is a breakthrough in conventional FCC technology in that it allows one to convert the high boiling residual components and provide the necessary and catalyst temperatures while at the same time providing an environment no appreciably harmful to the catalyst employed in the process. This ultimate high temperature catalyst regeneration operation is required to achieve the substantial instantaneous atomization/vaporization of the residual oil by the catalyst to convert the bottom of a barrel of crude, shale oil, etc., and any related liquid hydrocarbonaceous compound into gasoline. This is a major step toward reducing the dependence of 'free world nations' on imported crude oil.

Additional benefits resulting from the resid cracking process of this invention are a reduction in energy consumption in the overall processing of crude oil, and a reduction in both air and water pollution. Some of these savings are achieved by shutting down vacuum distillation units and/or various thermal processes in some instances. These and other known prior art processes would normally be used to further process atmospheric residua. Typical energy savings in a crude unit operation by shutting down a vacuum unit is about 0.6 vol.% to 1.0 vol.% on crude charge. Also, air and water pollution frequently associated with the aforementioned deleted process will be eliminated.

A further benefit resides in obtaining a sulfur removal of about 60-70% in the described resid cracking process. The thus formed $H_2S$ may be removed by amine scrubbing and fed to a claus unit for elemental sulfur recovery and sales as such, as opposed to eventual release as $SO_2$ in combustion processes.

It will be recognized by those skilled in the art that the conversion of residual hydrocarbons may be effected in a number of different apparatus arrangements such as in a riser cracking zone provided with multiple hydrocarbon feed inlet means thereto, in a riser contact zone discharging into a relatively shallow dense fluid catalyst bed to aid separation of hydrocarbon products from catalyst or any other arrangements suitable for the purpose. However, in any of these hydrocarbon conversion arrangements, regeneration of the catalyst used therein is more effectively improved by using the regeneration techniques of this invention. Therefore the regeneration concepts and operating techniques defined by this invention may be used to considerable advantage in any catalytic cracking operation.

FIG. I is a diagrammatic sketch on elevation of a side by side catalyst regeneration-hydrocarbon conversion arrangement of apparatus wherein two separate stages of catalyst regeneration are stacked above a common vertical axis to accomplish temperature restricted dense fluid bed catalyst regeneration followed by unrestrained higher temperature catalyst regeneration in an upflow relatively dense fluid catalyst system.

FIG. II is a diagrammatic sketch in elevation of a cyclone separator arrangement which may be employed with either of the riser hydrocarbon conversion zone on the upflowing catalyst second stage regeneration zone.

FIG. III is a top view of the cyclone arrangement of FIG. II.

DISCUSSION OF SPECIFIC EMBODIMENTS

In the processing schemes discussed below, arrangements of apparatus are provided for accomplishing the relatively high temperature catalytic cracking of a residual oil to produce gasoline boiling range material and hydrocarbon materials readily converted into gasoline boiling components and fuel oils. Regeneration of the cracking catalyst so employed is accomplished particularly in a two stage catalyst regeneration operation maintained under temperature restricted conditions in a first separate regeneration zone to particularly remove hydrogen deposited by hydrocarbonaceous products of the cracking operation. CO formation in the first generation zone is not particularly restricted and deactivation of the catalyst by steam formed in the hydrogen burning operation is held to a desired low level. Thereafter, hydrogen free residual carbon is removed from the partially regenerated catalyst in a second separate relatively dense fluid catalyst system at a more elevated temperature and sufficiently high oxygen concentration restricting the formation of any significant quantity of CO or steam by effecting combustion of residual carbon deposits on the catalyst. The temperature of the second stage catalyst regeneration is allowed to rise sufficiently high to provide a desired oil contact temperature. Generally the temperature range of the regenerated catalyst will be from about 1400° F. up to 1800° F. The regeneration flue gas of the second stage regeneration operation will therefore be substantially CO free if not completely free of CO. Since the flue gas of the second stage regeneration operation will be $CO_2$ rich, such $CO_2$ rich gas may or may not be employed thereafter for steam generation, stripping catalyst between stages of the process and other uses for such gas as desired. The catalyst thus regenerated and comprising a residual carbon on catalyst of less than about 0.20 weight percent and preferably less than 0.05 wt.% is recycled to the cracking operation.

It will be recognized by those skilled in the art that the processing scheme of this invention minimizes high temperature steam deactivation of the catalyst and is an energy conserving arrangement which is particularly desired in this day of energy restrictions. That is, the two stages regeneration operation of this invention reduces the air blower requirement over that of a single stage regeneration operation while accomplishing more complete coke removal. The first stage restricted relatively low temperature regeneration is not restricted to CO formation wherein steam is usually formed and the second stage higher temperature regeneration operation is accomplished in the absence of formed steam needs to remove only a portion of the total carbon initially deposited on the catalyst. These energy conserving operating conditions are of considerable economic advantage in that a smaller CO boiler for producing process utilized steam can be used since the volume of flue gas from the first stage regeneration step is less than that of a single stage regeneration system to accomplish a similar desired coke removal. The much higher temperature $CO_2$ flue gas recovered from the separate second stage regeneration operation and absence any significant combustion supporting level of CO may be cooled through a device or heat exchange means generating additional steam.

The processing arrangement of the invention provides a further energy conservation in that by charging atmospheric residual oil feed to the cracking operation, energy intensive vacuum distillation and other forms of feed preparation requiring significant energy are eliminated. Steam generated as above identified and/or process normally gaseous hydrocarbons may be used with the feed as a diluent to improve atomization of the feed upon contact with the hot regenerated catalyst. The catalyst charged to the cracking operation will be at a higher temperature than is normally obtained in the prior art single stage temperature limited regeneration operation and is obtained without steam and thermal damage to the catalyst. In addition the regeneration sequence of the invention more economically contributes more heat to the desired vaporization and endothermic conversion of the residual oil hydrocarbon charge as herein provided. Further energy conservation advantages are achieved by virtue of the fact that a residual oil comprising distress components of the crude oil are processed to more desirable products including gasoline through the elimination of satellite high energy consuming operations, such as vacuum distillation, propane deasphalting, visbreaking, delayed coking, hydrogen enriching operations and combinations thereof as employed heretofore in the petroleum refining industry.

The processing combinations of the present invention contemplate replacing catalyst circulated in the system with catalyst particles of a lower metals loading, or content, obtained for example as fresh catalyst or equilibrium catalyst from other cracking operation. Thus, a portion of the catalyst particles separated in the first stage regeneration operation or the second stage regeneration operation or both as normal catalyst loss may be replaced with fresh catalyst or catalyst particles of suitable cracking activity and comprising lower levels of metal contaminants.

The operating concepts of the present invention are useful in designing grass roots systems and adaptable to many different refining operations now in existance and comprising a single regeneration operation in combination with a hydrocarbon conversion operation such as riser cracking or a dense fluid bed cracking operation. In any of these operations it is intended that the regeneration temperature necessarily be restricted to a low temperature first stage and a second higher temperature separate regeneration operation in order to achieve the advantages of the present invention particularly with respect to energy conservation and eliminating high temperature damage to the cracking catalyst in the presence of formed steam.

It is immediately clear that the regenerating processing concepts of this invention lend themselves to improving substantially any hydrocarbon conversion process whether or not the hydrocarbon charged to the cracking operation comprises distress asphaltic components and metal contaminants or is merely a high coke producing charge material relatively free of significant amounts of metal contaminants and/or asphaltenes. However, as provided herein, the advantages of the processing innovation of this invention substantially improve as satellite treatment of the crude hydrocarbon charge to remove these materials is reduced.

It will be further recognized by those skilled in the prior art, that existing temperature restricted catalytic cracking and regeneration apparatus may be modernized to achieve the higher temperature operations of this invention with a minimum capital expenditure and downtime whether or not one is modernizing a stacked single stage reactor regenerator arrangement, a side-by-side single stage reactor regenerator arrangement or one of the more modern units comprising a riser reactor hydrocarbon conversion zone in combination with a dense catalyst bed in open communication with an upper riser catalyst regeneration operation.

Referring now to FIG. I by way of example, there is shown a side by side arrangement of apparatus for effecting riser catalytic conversion of a hydrocarbon feed at an elevated temperature and two separate stages of catalyst regeneration arranged one above the other on a common axis wherein the first stage of regeneration is accomplished in a dense fluid bed of catalyst and the second regeneration stage is accomplished in an upflowing relatively dense fluid catalyst phase at a high temperature above the temperature in the first regenerator.

In the arrangement of the drawing, hot regenerated catalyst of low residual carbon and obtained as hereinafter defined is charged by conduit 2 to the lower bottom portion of a riser hydrocarbon conversion zone 4. Aerating gas is charged to the bottom of riser 4 by conduit 6. The catalyst mixed with aerating gas passes up the riser for contact with hydrocarbon feed charged to the riser. The hydrocarbon or oil feed is charged to the riser through a plurality of separate curved pipe nozzles 8, extending through the wall of the riser to which oil is passed by conduit 10. Diluent steam or other suitable gaseous material may be charged for admixture with the oil feed by conduit 12. In a particular embodiment there are at least six pipe nozzles arranged above the riser for charging the oil feed to the riser so as to form a high temperature suspension of catalyst in vaporized hydrocarbons. The suspension thus formed passes upwardly through the riser and is discharged from the top portion thereof through slots in the riser wall in open communication with attached appendages 14 and 16 open only in the bottom portion thereof to the surrounding vessel 18. Appendages 14 and 16 are devices which encourage the suspension to separate substantially into hydrocarbon vaporous phase and a catalyst phase which falls downwardly into a fluid bed of catalyst particles 20 collected in the lower portion of vessel 18. The hydrocarbon vaporous phase, diluent material and stripping gas pass through one or more cyclone separators 22 in the upper portion of vessel 18 before being withdrawn by conduit 24. Stripping gas is charged by conduit 26 to a lower portion of catalyst bed 20 before passing the stripped catalyst to catalyst regeneration. The stripped catalyst is then passed by conduit 28, control valve 30 and conduit 32 to a fluid bed of catalyst 34 maintained in the lower portion of regeneration zone 36. Regeneration gas, such as air or an oxygen enriched gas, is charged to the lower portion of bed 34 by conduit 38 in an amount to accomplish a partial regeneration of the catalyst as defined above. That is regeneration zone 36, the first stage of catalyst regeneration is a temperature restricted, below 1500° F., regeneration zone maintained under conditions to accomplish incomplete removal of carbon from the catalyst and produce a flue gas comprising CO in combustion supporting amounts. The CO containing flue gas is passed through one or more cyclone separator 40 to receive entrained catalyst particles before withdrawal by conduit 42 and further use as herein provided. Catalyst particles separated by the cyclone are returned to the catalyst bed by a dipleg.

The partially regenerated catalyst is withdrawn from a lower bottom portion of catalyst bed 34 and mixed with a lift gas, such as air introduced by conduit 44, for passage upwardly through a riser regeneration zone initially comprising riser conduit 46 expanded into a larger diameter zone 48. Additional regeneration gas may be added to the lower portion of expanded regeneration zone 48 by conduit 50 communicating with a regeneration gas distributor ring. The regeneration of catalyst accomplished in riser 46 and expanded riser section 48 is intended to be accomplished in a catalyst particle concentration less than a dense fluid catalyst bed concentration of at least 35 pounds per cubic foot and more than about 5 or 10 pounds per cubic foot of catalyst. Catalyst concentrations less than 10 pounds per cubic foot are normally associated with dispersed catalyst phase operations.

The partially regenerated catalyst of the first stage regeneration operation is more completely regenerated in the second upflowing catalyst second stage of operation by using an excess of oxygen rich regeneration gas under higher temperature conditions above 1400° F. to produce $CO_2$ and remove substantially completely any carbon in the catalyst. It is intended to reduce residual carbon on the regenerated catalyst to less than 0.10 weight percent and more particularly to less than 0.05 weight percent. Regenerated catalyst and flue gas pass overhead from the expanded regeneration section 48 by conduit 50 communicating with a generally horizontal transfer conduit 52. The hot suspension of catalyst and flue gas pass through transfer conduit 52 to a suspension diverting device 54 which causes the suspension to separate substantially into a catalyst phase and a flue gas phase substantially comprising $CO_2$. The separated catalyst phase passes downwardly through a collecting zone into a bed of hot catalyst particles 58. Flue gases separated by device 54 pass into a cyclone separator 60 for recovery of entrained catalyst particles from $CO_2$ rich flue gases at a temperature within the range of 1400° F. up to 1800° F. The hot flue gases are recovered by conduit 62 for use as herein provided. Catalyst particles separated by cyclone 60 pass by dipleg 64 to catalyst bed 58. The hot regenerated catalyst collected in vessel 56 as bed 58 are aerated by an appropriate gas charged by conduit 66. This gas should be other than steam to avoid high temperature steam deactivation of the regenerated catalyst. The regenerated catalyst is then conveyed by standpipe 68 provided with flow control valve 70 to catalyst charge conduit 2 above identified.

The apparatus arrangement of FIG. I may be modified to incorporate means shown in FIG. II for separating a suspension of gasiform material from catalyst particles. Thus, for example, cyclone 22 in vessel 18 may be located outside of the vessel 18 by providing conduit 72 in open communication with the top of vessel 18 so that horizontal arms 74 and 76 can be provided with cyclone separators 78 and 80 hung on the outer ends thereof. Transfer conduits 74 and 76 are preferably obround in cross section and are horizontal curved as shown in FIG. III to aid centrifugal separation of catalyst particles from gasiform material which in this case would include hydrocarbon products of the high temperature cracking operation. In this modification the catalyst particles separated by the large cyclones would be conveyed by suitable diplegs to the catalyst bed 20. Separated hydrocarbon vapors would be recovered by conduits 82 and 84.

The regenerator apparatus of the second stage may be modified in a similar manner by providing the "T" shaped conduit means of FIG. II at the top of vessel 48 so that large cyclones can be hung from the outer end of the horizontal conduit sections. Thus a large cyclone may be hung from the outer end of transfer conduit 52 and there should be more than on such arrangment in view of the catalyst circulation rate used in this system. Catalyst particles thus separated from high temperature regeneration gas are then passed by suitable dipleg means to collection vessel 56 of FIG. I.

FIG. III is a top view of one arrangement of apparatus for providing external cyclone arrangements on the apparatus as above discussed. The figure is self explanatory in that identifying numbers correspond with those identified in FIG. II. A further discussion of the showing therefore does not appear warranted.

Having thus generally described the method and apparatus of this invention and discussed specific examples in support thereof it is to be understood that no undue restrictions are to be imposed by reason thereof except as defined by the following claims.

We claim:

1. A method for regenerating particles of catalyst containing deactivating amounts of hydrocarbonaceous deposits which comprises, passing particles of catalyst containing hydrocarbonaceous deposits into the upper portion of a first dense fluid bed of catalyst particles in a first regeneration zone, charging sufficient oxygen containing gas to a bottom portion of said catalyst bed to achieve a partial burning of hydrocarbonaceous deposits sufficient to burn substantially all hydrogen in the hydrocarbonaceous deposits and to produce a catalyst particle comprising from 10 to 80 wt% less carbonaceous deposits and a flue gas comprising CO and raise the temperature of the catalyst particles to within the range of 1250° to 1500° F., separately recovering partially regenerated catalyst and said flue gas comprising CO from said regeneration operation, passing partially regenerated catalyst from a bottom portion of said first dense fluid bed of catalyst particles as a confined upflowing stream in lift gas passing upwardly through said first bed of catalyst into the bottom of a second stage catalyst regeneration zone comprising upflowing catalyst wherein the concentration of catalyst particles is higher in a substantial portion thereof than encountered in a dispersed phase riser transport zone, introducing an oxygen containing gas into a bottom portion of said second regeneration stage separate from lift gas charged thereto with upflowing partially regenerated catalyst, effecting a more complete regeneration of catalyst particles in said second stage with excess oxygen in contact with the catalyst permitting the temperature of the regeneration operation to seek a higher temperature up to about 1800° F., recovering a flue gas comprising $CO_2$, entrained catalyst particles and free of combustion supporting amounts of CO from the upper end of said second stage of regeneration, separating a suspension of flue gas and all of the regenerated catalyst particles recovered from the upper end of said upflowing second stage regeneration zone external thereto into a $CO_2$ rich flue gas phase and a regenerated catalyst phase at an elevated temperature up to 1800° F. and recovering a regenerated catalyst comprising less than 0.05 wt% residual carbon thereon from said second regeneration zone suspension.

2. The method of claim 1 wherein the suspension separated from the second stage regeneration zone is initially partially separated in a zone which abruptly changes the direction of flow of the suspension into a downflowing concentrated mass of catalyst particles adjacent to a flue gas phase comprising a lower concentration of catalyst particles which is passed substantially immediately generally horizontally through a confined zone into a cyclone separation zone wherein entrained particles of catalyst are separated from $CO_2$ rich flue gases, and recovering the catalyst initially separated as a downflowing concentrated mass of catalyst particles at an elevated temperature up to 1800° F. for use in converting hydrocarbon feeds above the pseudocritical temperature of the feed.

3. The method of claim 1 wherein an upflowing suspension of flue gas and regenerated catalyst is passed through at least one horizontal transfer zone communicating tangentially with a cyclone separation zone wherein the suspension is separated to recover catalyst particles from flue gas.

4. The method of claim 3 wherein the horizontal transfer zone is obround and curved to initiate centrifugal separation of a flue gas-catalyst suspension prior to discharge into said cyclone separation zone.

5. A method for regenerating a cracking catalyst comprising hydrocarbonaceous deposits and metal deposits of hydrocarbon conversion which comprises, partially regenerating the catalyst in a first dense fluid catalyst bed regenerating zone by burning carbonaceous deposits to a residual level in the range of 10 to 90 wt% with sufficient oxygen to maintain the regeneration temperature below 1500° F., to burn substantially all hydrogen present and produce a CO rich flue gas thereby leaving residual carbon on the catalysts, separately recovering said CO rich flue gas from partially regenerated catalyst for combustion in a downstream combustion zone, further regenerating the partially regenerated catalyst comprising residual carbon in an upflowing second separate stage catalyst regeneration zone with added regeneration gas at a temperature above 1500° F. with excess oxygen sufficient to accomplish burning of residual carbon to a level below 0.05 wt% on the catalyst and produce a $CO_2$ rich flue gas absent combustion supporting amounts of CO, separating all of the regenerated catalyst of low residual carbon from said second regeneration zone at a temperature in the range of 1500° F. to 1800° F. from $CO_2$ rich flue gas in a sequence of external cyclone separating zones and separately recovering catalyst thus regenerated from very hot $CO_2$ rich flue gas for further use in hydrocarbon conversion.

* * * * *